(12) United States Patent
Condon et al.

(10) Patent No.: US 7,710,604 B2
(45) Date of Patent: May 4, 2010

(54) METHOD AND SYSTEM FOR PROVIDING A HIGH QUALITY HALFTONED IMAGE

(75) Inventors: John B. Condon, Berthoud, CO (US);
Mikel J. Stanich, Longmont, CO (US);
Jennifer Q. Trelewicz, Gilroy, CA (US);
John T. Varga, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1293 days.

(21) Appl. No.: 10/798,094

(22) Filed: Mar. 11, 2004

(65) Prior Publication Data

US 2005/0200897 A1 Sep. 15, 2005

(51) Int. Cl.
*G06K 15/00* (2006.01)

(52) U.S. Cl. .................. 358/3.03; 358/1.2; 358/1.9; 358/3.12; 382/298; 382/299

(58) Field of Classification Search ............... 358/1.2, 358/1.9, 3.12, 3.03; 382/298, 299
See application file for complete search history.

(56) References Cited

U.S. PATENT DOCUMENTS

| | | | | |
|---|---|---|---|---|
| 4,611,349 | A | 9/1986 | Hou | 382/47 |
| 5,097,518 | A * | 3/1992 | Scott et al. | 382/298 |
| 5,140,432 | A | 8/1992 | Chan | 358/298 |
| 5,208,871 | A | 5/1993 | Eschbach | 382/41 |
| 5,226,094 | A | 7/1993 | Eschbach | 382/41 |
| 5,235,432 | A | 8/1993 | Creedon et al. | 358/479 |
| 5,347,597 | A * | 9/1994 | Stephenson | 382/300 |
| 5,363,213 | A | 11/1994 | Coward et al. | 358/455 |
| 5,521,987 | A | 5/1996 | Masaki | 382/218 |
| 5,642,204 | A | 6/1997 | Wang | 358/455 |
| 5,737,453 | A | 4/1998 | Ostromoukhov | 382/275 |
| 5,754,707 | A | 5/1998 | Knowlton | 382/254 |
| 6,185,008 | B1 | 2/2001 | Shu et al. | 358/1.9 |
| 6,356,670 | B1 | 3/2002 | Keithley et al. | 382/300 |

(Continued)

FOREIGN PATENT DOCUMENTS

DE 196 24 205 A1 6/1996

(Continued)

OTHER PUBLICATIONS

P. W. Wong, "Adaptive Error Diffusion and Its Application in Multiresolution Rendering,"*IEEE Transactions on Image Processing*, vol. 5, No. 7, pp. 1184-1196 (Jul. 1996).

(Continued)

*Primary Examiner*—King Y Poon
*Assistant Examiner*—Lawrence E Wills
(74) *Attorney, Agent, or Firm*—Duft Bornsen & Fishman, LLP (57) ABSTRACT

A method and system for providing a halftoned image is disclosed. The method and system comprise scaling the halftoned image by performing pel repetition utilizing an error diffusion algorithm such that artifacts are minimized. According a system and method in accordance with the present invention performs pel repetition using error diffusion technology, so that any resulting "artifacts" are realized as high-frequency image addition, making them much less visible. A system and method in accordance with the present invention provides adjustability in the computational complexity of the scaling, so that quality can be traded off continuously against the amount of processing power required.

15 Claims, 7 Drawing Sheets

U.S. PATENT DOCUMENTS

| | | | |
|---|---|---|---|
| 6,438,274 B1 | 8/2002 | Tokuyama et al. | 382/298 |
| 6,563,957 B1 * | 5/2003 | Li et al. | 382/252 |

FOREIGN PATENT DOCUMENTS

| | | | |
|---|---|---|---|
| EP | 0 794 510 A2 | 10/1997 | |
| EP | 0 859 507 A2 | 8/1998 | |
| JP | 6-180568 A | 6/1994 | |
| JP | 11-331585 A | 11/1999 | |

OTHER PUBLICATIONS

T. D. Kite, N.D.-Venkata, B. L. Evans, and A. C. Bovik, "A Fast, High-Quality Inverse Halftoning Algorithm for Error Diffused Halftones," *IEEE Transactions on Image Processing*, vol. 9, No. 9, pp. 1583-1592 (Sep. 2000).

T. Mitsa and K. J. Parker, "Digital Halftoning Using a Blue Noise Mask," (Electrical Engineering Department, University of Rochester, Rochester, NY 14627; paper No. M9.25; pp. 2809-2812) CH2977-7/91/0000-2809 (1991-IEEE).

M. Analoui and J. Allebach, "New results on reconstruction of continuous-tone from halftone," *in Proceedings of ICASSP*, (San Francisco, CA), pp. II 313-316 (Mar. 1992).

* cited by examiner

| A | B | C |
|---|---|---|
| D | E | F |
| G | H | J |
| K | L | M |

FIG. 6A

| A | B | C |
|---|---|---|
| D | E | F |
|   |   |   |
| G | H | J |
| K | L | M |

FIG. 6B

| 11 | 3 | 7 |
|---|---|---|

FIG. 6C

|   |    | W |
|---|----|---|
|   |    |   |
| N | SE |   |
|   | SW |   |
|   |    |   |

FIG. 6D

| A | B | C |
|---|---|---|
| D | E | F |
| a | b | c |
| G | H | J |
| K | L | M |

FIG. 6E

| A | C | B |
|---|---|---|
| a | E | F |
| D | J | c |
| G | K | b |
| H | L | M |

METHOD AND SYSTEM FOR PROVIDING A HIGH QUALITY HALFTONED IMAGE

FIELD OF THE INVENTION

The present invention relates generally to providing a high quality image and more particularly to providing a high quality halftoned image.

BACKGROUND OF THE INVENTION

Figure 1:
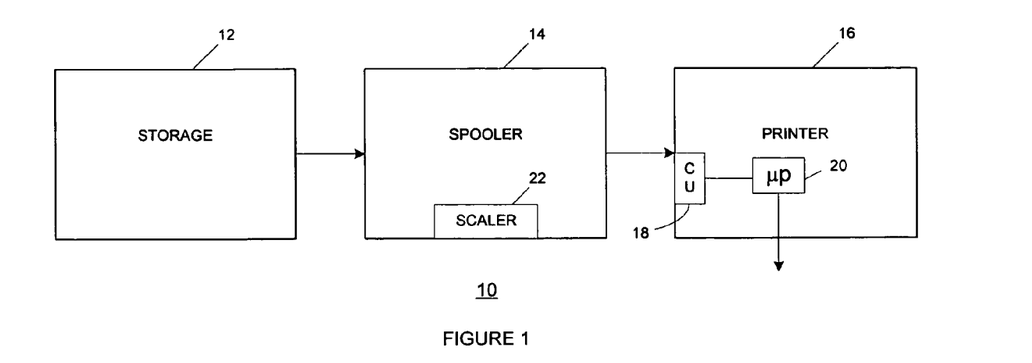
FIG. 1 is a block diagram of a conventional system for printing halftoned images

FIG. 1 is a block diagram of a conventional system 10 for printing halftoned images. In such a system 10 a storage device 12 provides continuous tone (contone) images to a spooler 14. The spooler converts the image to a halftoned image which is typically scaled by scaler 22. The scaled halftoned image is then provided to a control unit 18 of the printer 16. A processor 20 processes the scaled halftoned image and prints it on a document.

Scaling halftoned images is required in cases where the resolution of the original image does not match the desired resolution of the output medium. This problem exists, for example, in some conventional printers, where the print heads are configured for 604 dpi, but customers have large databases of images in 600 dpi. Periodic pixel repetition solves this problem acceptably for text and line art, but produces low-frequency (and thus, highly visible) artifacts for pre-screened images, degrading image quality significantly.

In one inkjet printer, the halftones have already been pre-calculated. This calculation is time-intensive, and thus, recalculation cannot be done in real time. Additionally, pre-screened images may use either stochastic, dispersed, or clustered-dot halftones, depending on the database of the customer. Furthermore, there will be no printer system control over the structure of these pre-screened halftones.

In "Non-Integer Scaling of Raster Images", U.S. Pat. No. 6,226,420 (Filed: Dec. 26, 1997 Hamil), 240 dpi to 600 dpi scaling is achieved with a special pel repetition pattern that produces high-quality image. However, the 600 dpi to 604 dpi scaling required by a conventional printer would require (a) a completely new pel repetition pattern (b) that is very large in order to avoid low-frequency artifacts. Even the above-identified scaling results in low-frequency artifacts in some pre-screened data.

This problem has also been addressed by adding an extra line of pels every 0.25 inch. This method works well for large text, acceptably but not terrifically for small or fine text, and very poorly for halftoned images.

The traditional way of addressing such a problem involves descreening, scaling, and rescreening. An example of this method is described in the paper entitled, "*New Results on Reconstruction of Continuous-Tone from Halftone,*" by Anaboui et al in IEEE paper 0-7803-0532-9/92 (1992). However, this method results in reduction of image resolution (if the descreening filter is too course), or in the potential introduction of Moiré patterns (if the descreening filter is too fine). Many applications will be unlikely to tolerate these kinds of artifacts in their images.

Accordingly, what is needed is a system and method which provides a high quality halftoned image with minimal artifacts. The system and method should be compatible with image printing architectures, cost effective and easily implementable. The present invention addresses such a need.

SUMMARY OF THE INVENTION

A method and system for providing a halftoned image is disclosed. The method and system comprise scaling the halftoned image by performing pel repetition utilizing an error diffusion algorithm such that artifacts are minimized.

According a system and method in accordance with the present invention performs pel repetition using error diffusion technology, so that any resulting "artifacts" are realized as high-frequency image addition, making them much less visible. A system and method in accordance with the present invention provides adjustability in the computational complexity of the scaling, so that quality can be traded off continuously against the amount of processing power required.

DETAILED DESCRIPTION OF THE INVENTION

The present invention relates generally to providing a high quality image and more particularly to providing a high quality halftoned image. The present invention relates generally to computer systems and more particularly to the manufacturing of computer systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Accordingly, in a system and method in accordance with the present invention error diffusion scaling is utilized to provide a high quality halftoned image. Error diffusion scaling achieves an average result by spreading a discrete approximation to the desired result over a large area. Error diffusion works in the context of the following tradeoffs:

1. The larger the area over which the error can be spread, the higher is the frequency of the artifact (and thus the lower the visibility of the artifact).

2. The smaller the area over which the error is spread, the lower is the computational load of the calculation.

To describe the features of the present invention in more detail refer now to the following discussion in conjunction with the accompanying figures.

Figure 2:
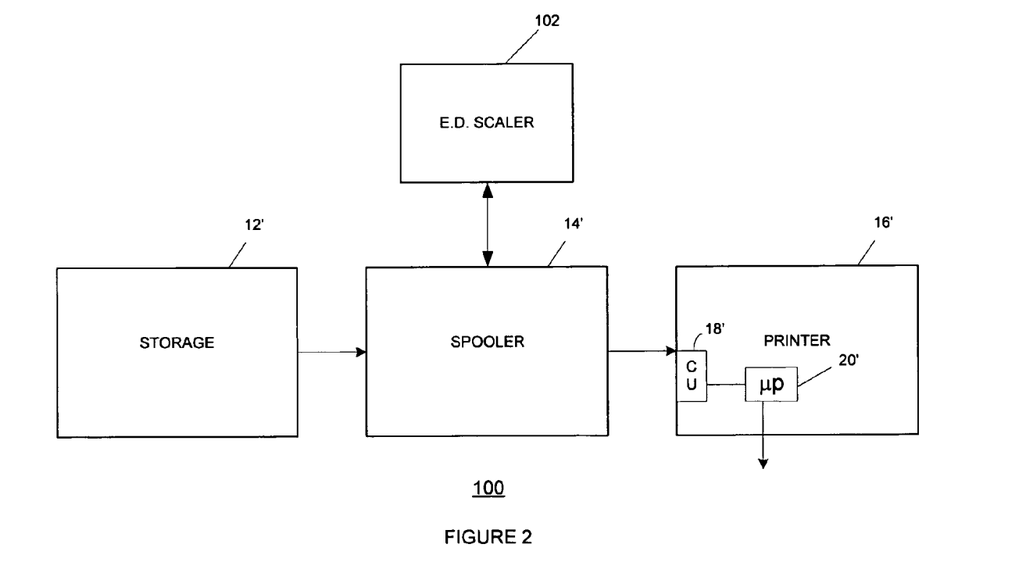
FIG. 2 is a block diagram of a system for printing halftoned images in accordance with the present invention.

FIG. 2 is a block diagram of a system 100 for printing halftoned images in accordance with the present invention. As is seen, the storage device 12', the spooler 14', and the printer 16' are very similar to that shown in FIG. 1. However, a significant difference is the use of an error diffusion scaler 102 in conjunction with the spooler 14 to provide for the high quality halftoned images. An error diffusion approach is described for example in the paper entitled, "Adaptive Error Diffusion and its Application in Multiresolution Rendering," by P. W. Wong, in *IEEE Transactions on Image Processing*, Vol. 5, No. 7, pp. 1184-1196 (July 1996).

Pseudo random, diffusion, and other methods for dispersing error in the block discussed here are assumed to be deterministic unless indicated otherwise. Specifically, the mappings are calculated in advance and fixed. The calculations are done so that the algorithms introduce spatial frequency content that is not offensive to the human eye—thus the term "pseudo random"—but are not necessarily calculated using a random seed on the fly during processing. Repeatability is important for the algorithm, since it enables (1) experimentation and/or analysis to eliminate unpleasing random patterns for more pleasing ones, (2) multiple copies of a job to be processed without appearing different to the customer, and (3) identical CRCs on pages between test runs, for verification purposes. However, on-the-fly random numbers could be used in a system with the computational power to perform this calculation, and without the need for repeatability.

Figure 3:
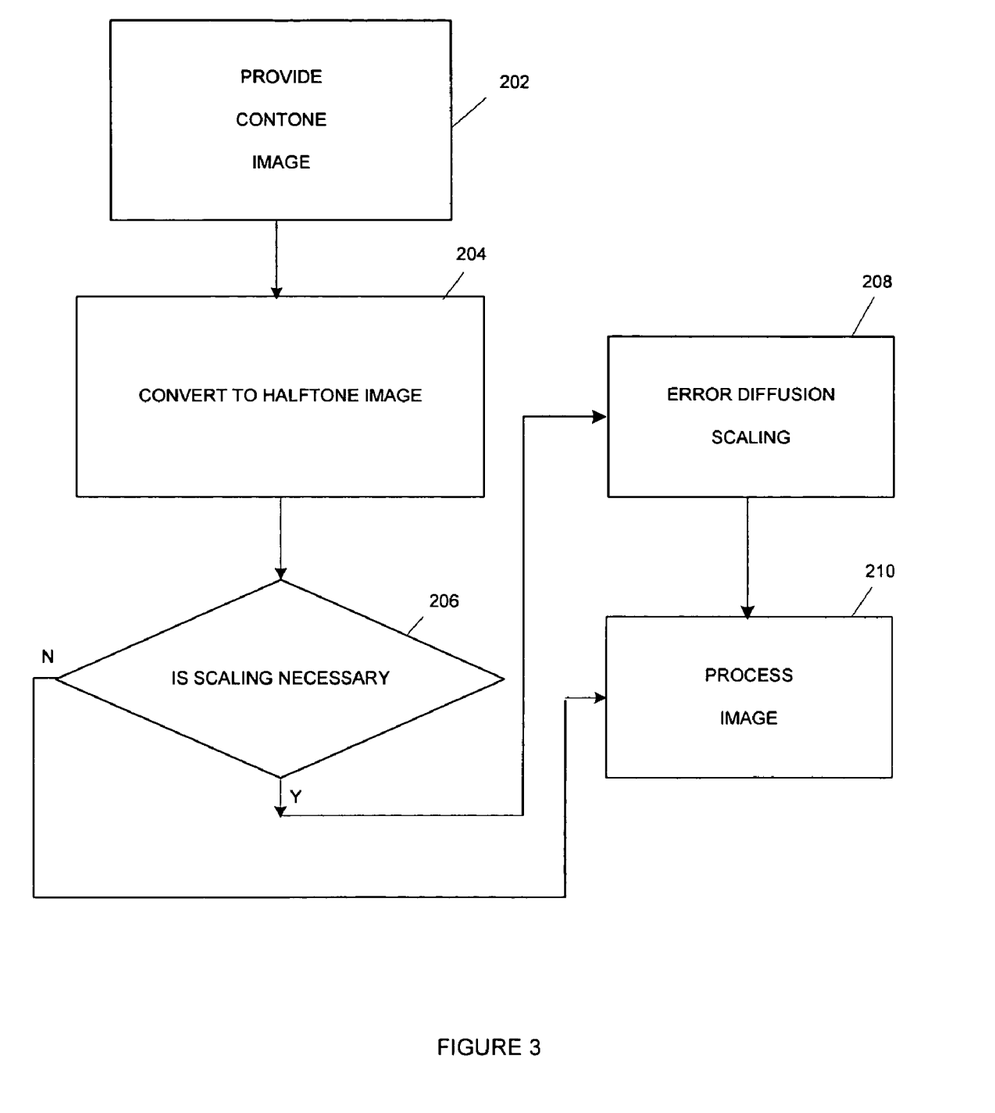
FIG. 3 is a flow chart of a method for providing high quality halftoned images in accordance with the present invention.

FIG. 3 is a flow chart of a method for providing high quality halftoned images in accordance with the present invention. In this method, first a contone image is provided, via step 202. Then the image is converted to a halftoned image, via step 204. Then it is determined if scaling is necessary, via step 206. If scaling is not necessary, the image can be processed, via step 210. If scaling is necessary, then error diffusion scaling is provided on the image, via step 208, and then the image is processed, via step 210.

Figure 4:
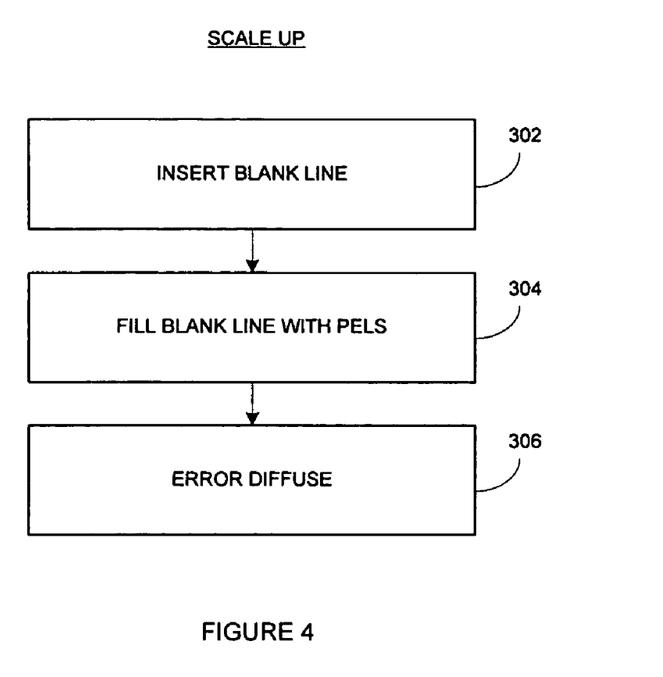
FIG. 4 illustrates a method for scaling up a halftoned image in accordance with the present invention.

FIG. 4 illustrates a method for scaling up a halftoned image in accordance with the present invention. In accordance with the present invention, first a blank line can be inserted to scale up the image, via step 302. Thereafter, the blank line is populated with pixels, via step 304. Finally, the image is error diffused, via step 306. In another embodiment, steps 304 and 306 can be combined, both the lines can be populated with pixels, and the error diffusion can be provided at the same time.

Figure 5:
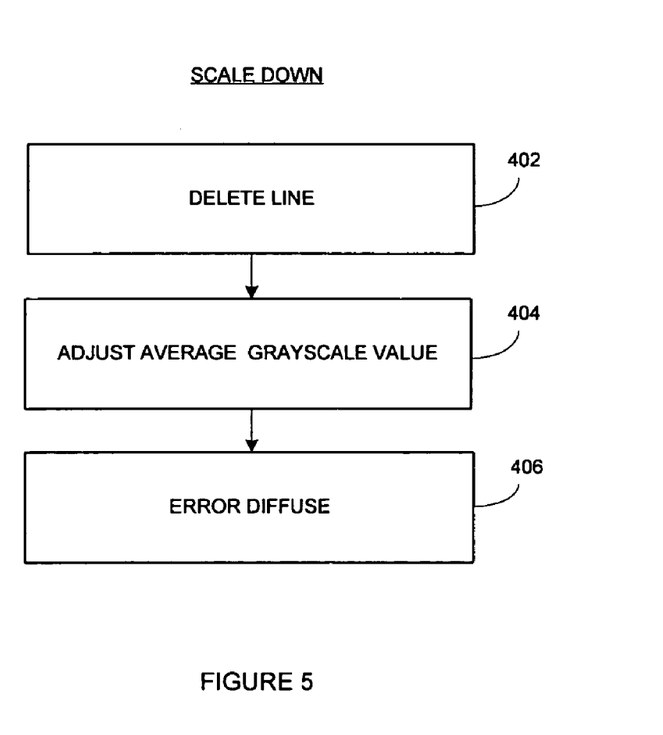
FIG. 5 illustrates a method for scaling down a halftoned image in accordance with the present invention.

FIG. 5 illustrates a method for scaling down a halftoned image in accordance with the present invention. In scaling down an image, first a line is deleted via step 402. Then the image is adjusted for the average grey-level value via step 404. Then area diffusion is provided in step 406. Once again, similar to FIG. 4, adjusting the grey-level value and the area diffusion can occur simultaneously, to speed up the process.

Halftoned Scaling Using Error Diffusion

Considering an n×m pel grid of the image (note that n and m do not need to be equal, so the scaling does not need to be equal on the two image axes), which needs to be scaled to n+1×m. In the case of 600×600 dpi to 604×600 dpi scaling, a block would be 150×150 pels, and would be scaled to a block 151×150 pels. In a preferred embodiment, an n×m+1 scaling would be performed exchanging the row and columns in the definition. Since any scale up/scale down could be done with the +1 to n or m, and a system and method in accordance with the present invention could be generalized to cover n+k and m+r, (where k and r could be any number) but that this could result in lower quality because of local distortion to the image.

The requirements for scaling are the following:

1. The average intensity of a given block (of pixels) in the image should be essentially unchanged, as much as possible. Average intensity is defined as the sum of the pel values in the block divided by the number of pels in the block. It should be noted that simple row or column repetition in a block to provide scaling does not necessarily achieve unchanged intensity, depending on the value of the row or column duplicated.

2. No pel from the original block should be shifted by more than one pel position in the scaled block. This will essentially maintain the detail and shading structure of the original block. One could shift by more than one, but the quality may suffer because of the larger area of diffused average gray value.

Requirement number 2 is addressed with a shifting matrix, which determines which of the n×m pels are shifted to another position to accommodate the new pels. For example, a shifting matrix can be implemented as two shifting vectors. The first shifting vector has n elements in 0 . . . m, chosen at random.

Requirement number 1 may be addressed in several ways:

A. Use a threshold matrix (either the original or another) to threshold the new line of pels based on the average intensity of a n'×m' block, where n' and m' are not necessarily equal to n and m, respectively. For example, if n'<n and m'<m, then each diffusion block encompasses more than one halftoning block, allowing pels shifts to be high-pass filtered over a larger number of threshold matrices. If n' and m' are small, then locating dithering is set based on a small number of nearby pels.

B. Set a vacated pel to the rounded (potentially weighted) mean of its original pel neighbors. It is understood by one of ordinary skill in the art that another form of averaging could be used. This is in some sense a specific example of the dithering described above.

Both of these methods keep the average intensity close to the original, since the pels that are duplicated are chosen at random.

Example of Error Diffusion Scaling

Figure 6A:
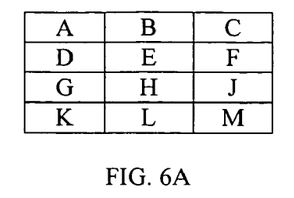
FIG. 6A-6F illustrate an example of error diffusion scaling in accordance with the present invention.
Figure 6B:
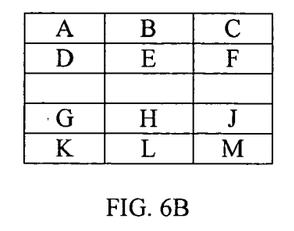
Figure 6C:
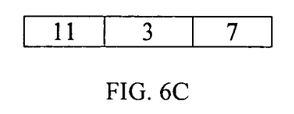
Figure 6D:
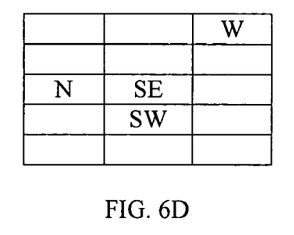
Figure 6E:
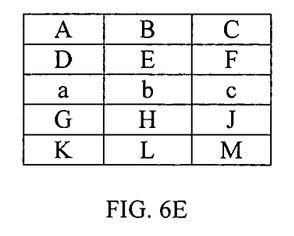
Figure 6F:
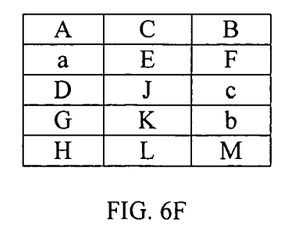

An example of error diffusion scaling in accordance with the present invention is described below:

Starting with n=4 and m=3 (the numbers are chosen this small just for illustration purposes), and the block as illustrated in FIG. 6A. Shifting vectors are set so that a pel is exchanged with its neighbor. Not every pel is shifted, and pels are more likely to be shifted the closer they are to the newly-added line (for example, with a Gaussian distribution). The newly-added line is positioned to be at the center of the window as illustrated in FIG. 6B. One pel can only be exchanged with one other pel. FIG. 6C illustrates a candidate dithering matrix. FIG. 6D is the shifting matrix, where the codes in the blocks are compass directions for the pel to be exchanged. FIG. 6E illustrates an example of the dithered values. After shifting, the block is illustrated in FIG. 6F.

Another important point concerns the choice of the shifting vectors in the matrix. Because an image may be printed n-up (where n is one or greater) in an application, these applications will benefit from matrices that do not differ in result based on the rotation of the image. The result of rotation invariance is that the image will have the same result regardless of rotation, which will be important to some customers. In these cases, we will also require m=n, of course, to facilitate the rotation invariance of the matrix.

Adjustability of the Algorithm

The algorithm may be adjusted for better quality in several ways:

The shifting matrix may be calculated afresh for each block, or may be chosen at random from several available matrixes, to further distribute the pattern of the shifting over the image. This can further reduce low-frequency artifacts.

The values of the "new" pels may be determined in a more sophisticated fashion; e.g., by application of a Gaussian filter to the original block to get a weighted mean, adjusted so that the average intensity of the block is unchanged.

Figure 7A:
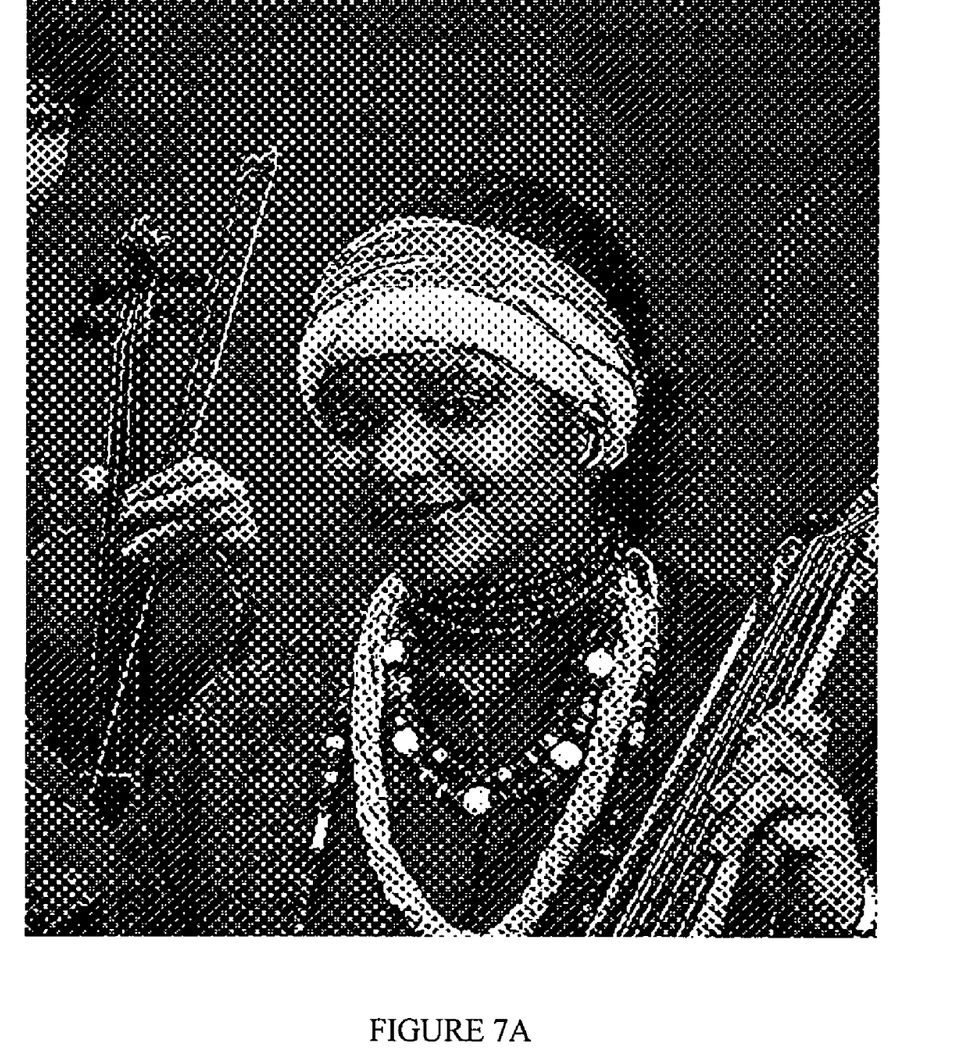
FIG. 7A-7C show a comparison of a method in accordance with the present invention to a conventional method for performing 600-to-604 dpi scaling of halftoned images.
Figure 7B:
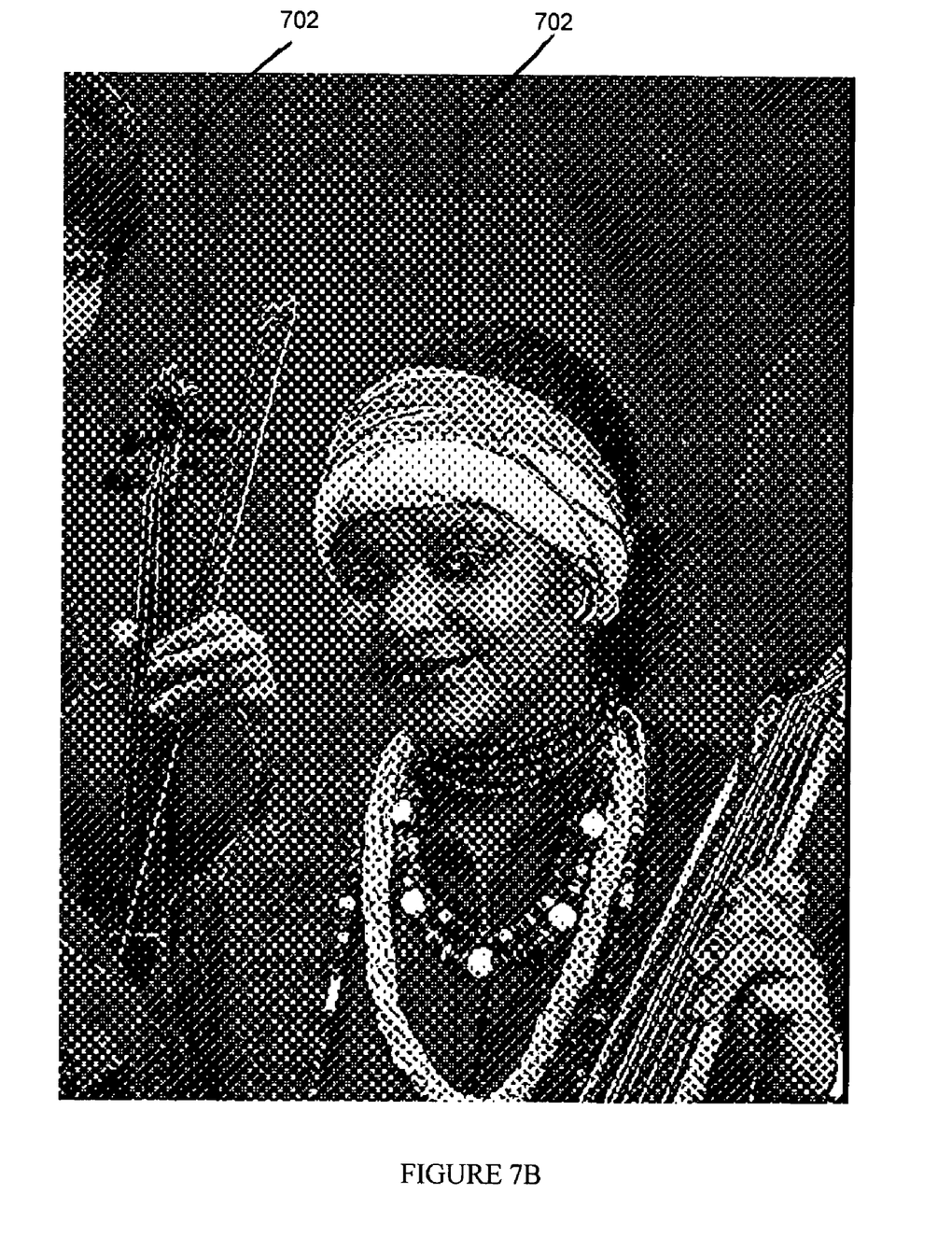
Figure 7C:
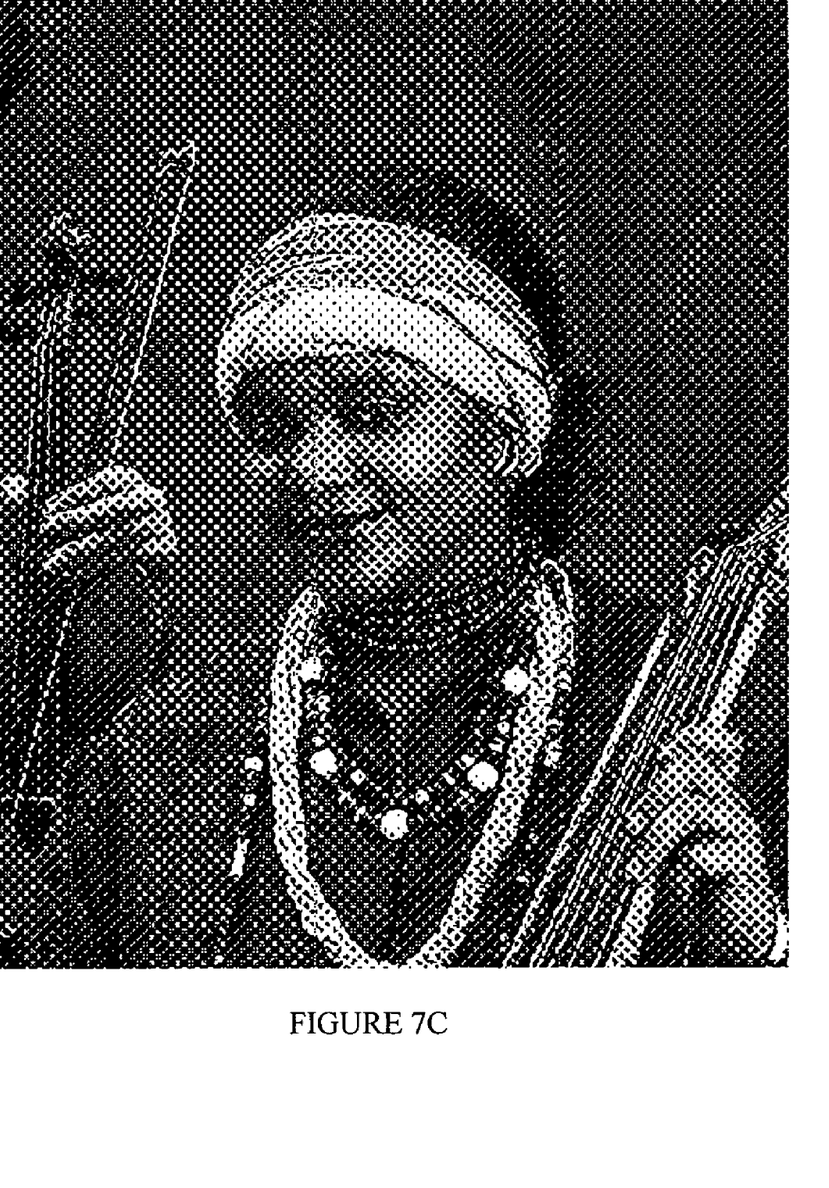

FIGS. 7A-7C show a comparison of a method in accordance with the present invention to a conventional method for performing 600-to-604 dpi scaling of halftoned images. FIG. 7A is the original halftoned image. FIG. 7B uses conventional scaling methods. It should be noted that the clear grid patterns 702 evident in the scaled image are often unacceptable in printed images. FIG. 7C uses an error diffusion scaling algorithm in accordance with the present invention scaling method, and shows no such grid patterns.

Accordingly, a system and method in accordance with the present invention performs pel repetition using error diffusion technology, so that any resulting "artifacts" are realized as high-frequency image addition, making them much less visible. A system and method in accordance with the present invention provides adjustability in the computational complexity of the scaling, so that quality can be traded off continuously against the amount of processing power required.

Although the present invention has been described in accordance with the embodiments shown, one of ordinary skill in the art will readily recognize that there could be variations to the embodiments and those variations would be within the spirit and scope of the present invention. For example, although the present invention has been described in the context of a printer that prints a single color, one of ordinary skill in the art readily recognizes that a system and method in accordance with the present invention could be used in a printer that prints multiple colors. In such a printer the inserted lines would be provided for each color plane, preferably in such a way that the inserted lines do not align between the color planes. Accordingly, many modifications may be made by one of ordinary skill in the art without departing from the spirit and scope of the appended claims.

What is claimed is:

1. A method of scaling a halftone image using error diffusion, the method comprising:
   identifying a first matrix of n×m pels in the halftone image;
   calculating an average intensity of the first matrix of pels;
   generating a second matrix of (n+1)×m pels from the first matrix of pels by inserting a line of pels in the first matrix of pels;
   generating a scaled output matrix of (n+1)×m pels from the second matrix of pels by assigning new pel values to each pel in the line of pels using an error diffusion process, wherein the average intensity of the scaled output matrix of pels is substantially unchanged from the average intensity of the first matrix of pels;
   generating a (n+1)×m shift matrix based on the second matrix and including at least one shift indicator defining an exchange between a pel and its neighboring pel, wherein a probability of occurrence of the at least one shift indicator in a position of the (n+1)×m shift matrix is proportional to a distance between the position and the line of pels in the second matrix;
   exchanging at least one pel in the scaled output matrix with its neighboring pel based on the shift matrix; and
   performing the previous steps for each unidentified matrix of n×m pels in the halftone image to generate a scaled output of the halftone image.

2. The method of claim 1 wherein no pel in the first matrix of pels is shifted more than one position from its neighboring pels to generate the scaled output matrix.

3. The method of claim 1 wherein no pel in the first matrix of pels is shifted more than once to generate the scaled output matrix.

4. The method of claim 1 wherein the error diffusion process comprises:
   identifying a n'×m' matrix of pels around each pel in the line of pels, wherein n'>n and m'>m; and
   assigning each new pel value in the scaled output matrix of pels using a threshold based on an average intensity calculation of pel values in the n'×m' matrix of pels.

5. The method of claim 1 wherein the error diffusion process comprises:
   identifying a n'×m' matrix of pels around each pel in the line of pels, wherein n'>n and m'>m; and
   assigning each new pel value in the scaled output matrix of pels based on a calculation of a rounded weighted mean of pel values in the n'×m' matrix of pels.

6. A system operable to scale a halftone image using error diffusion, the system comprising:
   a spooler operable to convert a contone image into the halftone image for processing; and
   an error diffusion scaler operable to identify a first matrix of n×m pels in the halftone image, to calculate an average intensity of the first matrix of pels, to generate a second matrix of (n+1)×m pels from the first matrix of pels by inserting a line of pels in the first matrix of pels, to generate a scaled output matrix of (n+1)×m pels from the second matrix of pels by assigning new pel values to each pel in the line of pels using an error diffusion process, wherein the average intensity of the scaled output matrix of pels is substantially unchanged from the average intensity of the first matrix of pels, to generate a (n+1)×m shift matrix based on the second matrix and including at least one shift indicator defining an exchange between a pel and its neighboring pel, wherein a probability of occurrence of the at least one shift indicator in a position of the shift matrix is proportional to a distance between the position and the line of pels in the second matrix, to exchange at least one pel in the scaled output matrix with its neighboring pel based on the shift matrix, and to perform the previous steps for each unidentified matrix of n×m pels in the halftone image generating a scaled output of the halftone image.

7. The system of claim 6 wherein no pel in the first matrix of pels is shifted more than one position from its neighboring pels to generate the scaled output matrix.

8. The system of claim 6 wherein no pel in the first matrix of pels is shifted more than once to generate the scaled output matrix.

9. The system of claim 6 wherein the error diffusion process comprises:
   identifying a n'×m' matrix of pels around each pel in the line of pels, wherein n'>n and m'>m; and
   assigning each new pel value in the scaled output matrix of pels using a threshold based on an average intensity calculation of pel values in the n'×m' matrix of pels.

10. The system of claim 6 wherein the error diffusion process comprises:
    identifying a n'×m' matrix of pels around each pel in the line of pels, wherein n'>n and m'>m; and
    assigning each new pel value in the scaled output matrix of pels based on a calculation of a rounded weighted mean of pel values in the n'×m' matrix of pels.

11. A computer readable medium tangibly embodying programmed instructions which, when executed by a computer system, are operable for performing a method of scaling a halftone image using error diffusion, method comprising:
    identifying a first matrix of n×m pels in the halftone image;
    calculating an average intensity of the first matrix of pels;
    generating a second matrix of (n+1)×m pels from the first matrix of pels by inserting a line of pels in the first matrix of pels;

generating a scaled output matrix of (n+1)×m pels from the second matrix of pels by assigning new pel values to each pel in the line of pels using an error diffusion process, wherein the average intensity of the scaled output matrix of pels is substantially unchanged from the average intensity of the first matrix of pels;

generating a (n+1)×m shift matrix based on the second matrix and including at least one shift indicator defining an exchange between a pel and its neighboring pel, wherein a probability of occurrence of the at least one shift indicator in a position of the shift matrix is proportional to a distance between the position and the line of pels in the second matrix;

exchanging at least one pel in the scaled output matrix with its neighboring pel based on the shift matrix; and performing the previous steps for each unidentified matrix of n×m pels in the halftone image to generate a scaled output of the halftone image.

12. The computer readable medium of claim 11 wherein no pel in the first matrix of pels is shifted more than one position from its neighboring pels to generate the scaled output matrix.

13. The computer readable medium of claim 11 wherein no pel in the first matrix of pels is shifted more than once to generate the scaled output matrix.

14. The computer readable medium of claim 11 wherein the error diffusion process comprises:

identifying a n'×m' matrix of pels around each pel in the line of pels, wherein n'>n and m'>m; and assigning each new pel value in the scaled output matrix of pels using a threshold based on an average intensity calculation of pel values in the n'×m' matrix of pels.

15. The computer readable medium of claim 11 wherein the error diffusion process comprises:

identifying a n'×m' matrix of pels around each pel in the line of pels, wherein n'>n and m'>m; and assigning each new pel value in the scaled output matrix of pels based on a calculation of a rounded weighted mean of pel values in the n'×m' matrix of pels.

\* \* \* \* \*